(12) United States Patent
Liu et al.

(10) Patent No.: US 10,083,251 B2
(45) Date of Patent: Sep. 25, 2018

(54) DATA PROCESSING METHOD AND APPARATUS FOR COUNTING WEBPAGE HITS

(71) Applicant: BEIJING GRIDSUM TECHNOLOGY CO., LTD., Beijing (CN)

(72) Inventors: Hexiang Liu, Beijing (CN); Xin He, Beijing (CN)

(73) Assignee: BEIJING GRIDSUM TECHNOLOGY CO., LTD., Beijing (CN)

( * ) Notice: Subject to any disclaimer, the term of this patent is extended or adjusted under 35 U.S.C. 154(b) by 207 days.

(21) Appl. No.: 15/033,953

(22) PCT Filed: Nov. 3, 2014

(86) PCT No.: PCT/CN2014/090189
§ 371 (c)(1),
(2) Date: May 3, 2016

(87) PCT Pub. No.: WO2015/067154
PCT Pub. Date: May 14, 2015

(65) Prior Publication Data
US 2016/0283609 A1     Sep. 29, 2016

(30) Foreign Application Priority Data

Nov. 6, 2013 (CN) ............ 2013 1 0547813

(51) Int. Cl.
*G06F 17/30* (2006.01)
*H04L 12/26* (2006.01)
*H04L 29/08* (2006.01)

(52) U.S. Cl.
CPC .... *G06F 17/30958* (2013.01); *G06F 17/3089* (2013.01); *G06F 17/30713* (2013.01);
(Continued)

(58) Field of Classification Search
CPC ......... G06F 17/30958; G06F 17/30713; G06F 17/3089; H04L 43/06; H04L 67/02; H04L 67/22
See application file for complete search history.

(56) References Cited

U.S. PATENT DOCUMENTS

2008/0097834 A1    4/2008  McElfresh et al.
2010/0332962 A1*  12/2010  Hammer .......... G06F 17/30864
                                                                715/205
(Continued)

FOREIGN PATENT DOCUMENTS

CN     101299688 A    11/2008
CN     101777080 A    7/2010
(Continued)

OTHER PUBLICATIONS

English Abstract of CN103530431 A, Jan. 22, 2014.
(Continued)

*Primary Examiner* — Quang N Nguyen
*Assistant Examiner* — Billy H Ng
(74) *Attorney, Agent, or Firm* — Porter Wright Morris & Arthur LLP

(57) ABSTRACT

The disclosure discloses a data processing method and apparatus for counting webpage hits. The data processing method for counting webpage hits includes: a coordinate system of a monitored webpage is acquired; webpage hits are recorded by the coordinate system; hotspot regions on the webpage are determined according to the hits; and the number of determined hotspot regions are counted. By means of the disclosure, the problem in the relevant art that the webpage hits cannot be counted based on regions is solved, thereby achieving an effect of automatically counting the number of hit hotspot regions on the webpage.

6 Claims, 2 Drawing Sheets

(52) U.S. Cl.
CPC .............. *H04L 43/06* (2013.01); *H04L 67/02* (2013.01); *H04L 67/22* (2013.01)

(56) References Cited

U.S. PATENT DOCUMENTS

| | | | | |
|---|---|---|---|---|
| 2012/0010995 A1* | 1/2012 | Skirpa | ................... | G06F 3/0481 |
| | | | | 705/14.49 |
| 2013/0166394 A1* | 6/2013 | Churchill | ............. | G06K 9/4623 |
| | | | | 705/14.72 |

FOREIGN PATENT DOCUMENTS

| | | |
|---|---|---|
| CN | 102830922 A | 12/2012 |
| CN | 103530431 A | 1/2014 |
| WO | 2007-071529 A1 | 6/2007 |

OTHER PUBLICATIONS

English Abstract of CN101777080 A, Jul. 14, 2010.
English Abstract of CN102830922 A, Dec. 19, 2012.
English Abstract of CN101299688A, Nov. 5, 2008.

* cited by examiner

DATA PROCESSING METHOD AND APPARATUS FOR COUNTING WEBPAGE HITS

TECHNICAL FIELD

The disclosure relates to the field of data processing, and in particular to a data processing method and apparatus for counting webpage hits.

BACKGROUND

Currently, in the relevant art, a webpage hotspot hitting technology is associated with visualization of hotspots and information of hotspot regions. In addition, the webpage hotspot hitting technology is mainly realized as follows. (1) A coordinate system of a webpage is constructed. (2) A hit coordinate position is recorded. (3) The hit coordinate position is associated with relevant information. However, the solution of the relevant art cannot count webpage hits based on regions.

An effective solution is not proposed currently for the problem in the relevant art that the webpage hits cannot be counted based on the regions.

SUMMARY

The disclosure is mainly intended to provide a data processing method and apparatus for counting webpage hits, which are used to solve the problem in the relevant art that the webpage hits cannot be counted based on the regions.

In order to achieve the aim, according to one aspect of the disclosure, a data processing method for counting webpage hits is provided, which may include that: a coordinate system of a monitored webpage is acquired; webpage hits are recorded by the coordinate system; hotspot regions on the webpage are determined according to the hits; and the number of determined hotspot regions are counted.

Furthermore, the step that the hotspot regions on the webpage are determined according to the hits may include that: a region of which the density of the hits is greater than a predetermined threshold value is acquired; and the acquired region is taken as a hotspot region.

Furthermore, the step that the region of which the density of the hits is greater than the predetermined threshold value is acquired may include that: a point is optionally selected in a two-dimensional planar space of the webpage, and then a circle is described by taking the point as the centre of the circle and taking r as a radius, wherein a vector will be generated between each hit point falling within the circle and the centre of the circle, the centre of the circle is taken as a starting point of the vector, a hit point falling within the circle is taken as an end point, and there can be one or multiple vectors; the one or multiple vectors are added to obtain a Meanshift vector; it is judged whether a modulus of the Meanshift vector is smaller than a predetermined extreme value; when it is determined that the modulus of the Meanshift vector is smaller than the predetermined extreme value, the density of the hits and an independent continuous region are acquired via the Meanshift vector; it is judged whether the density of the hits is greater than the predetermined threshold value; and the region of which the density of the hits is greater than the predetermined threshold value is acquired in the independent continuous region.

Furthermore, the density of the hits is acquired in modes as follows. Hit count of each region in the independent continuous region is acquired. Each hit count is divided by the corresponding region to obtain the density of the hits of the corresponding region.

Furthermore, the independent continuous region is obtained in modes as follows. Coordinate positions of the centre of the circle in the webpage are classified and aggregated. A region formed by a set of coordinates of the centre of the circle, pointing to the same end point, in the webpage is recorded as the independent continuous region.

In order to achieve the aim, according to another aspect of the disclosure, a data processing apparatus for counting webpage hits is provided, which may include: an acquisition unit, configured to acquire a coordinate system of a monitored webpage; a recording unit, configured to record hits on the webpage by the coordinate system; a determination unit, configured to determine hotspot regions on the webpage according to the hits; and a counting unit, configured to count the number of determined hotspot regions.

Furthermore, the determination unit may include: an acquisition module, configured to acquire a region of which the density of the hits is greater than a predetermined threshold value; and a determination module, configured to take the acquired region as a hotspot region.

Furthermore, the acquisition module may include: a vector processing sub-module, configured to optionally select a point in a two-dimensional planar space of the webpage, and then describe a circle by taking the point as the centre of the circle and taking r as a radius, wherein a vector will be generated between each hit point falling within the circle and the centre of the circle, the centre of the circle is taken as a starting point of the vector, a hit point falling within the circle is taken as an end point, and there can be one or multiple vectors; a mean sub-module, configured to add the one or multiple vectors to obtain a Meanshift vector; a first judgment sub-module, configured to judge whether a modulus of the Meanshift vector is smaller than a predetermined extreme value; a first acquisition sub-module, configured to acquire the density of the hits and an independent continuous region via the Meanshift vector, when it is determined that the modulus of the Meanshift vector is smaller than the predetermined extreme value; a second judgment sub-module, configured to judge whether the density of the hits is greater than the predetermined threshold value; and a second acquisition sub-module, configured to acquire the region of which the density of the hits is greater than the predetermined threshold value in the independent continuous region.

Furthermore, the acquisition module may be configured to acquire hit count of each region in the independent continuous region, and divide each hit count by the corresponding region to obtain the density of the hits of the corresponding region.

Furthermore, the acquisition module may be configured to classify and aggregate coordinate positions of the centre of the circle in the webpage, and take a region formed by a set of coordinates of the centre of the circle, pointing to the same end point, in the webpage as the independent continuous region.

By means of the disclosure, the coordinate system of the monitored webpage is acquired; the webpage hits are recorded by the coordinate system; the hotspot regions on the webpage are determined according to the hits; and the number of determined hotspot regions are counted. The problem in the relevant art that the webpage hits cannot be counted based on regions is solved, thereby achieving an effect of automatically counting the number of hit hotspot regions on the webpage.

BRIEF DESCRIPTION OF THE DRAWINGS

The drawings forming a part of the disclosure are intended to provide further understanding of the disclosure. The schematic embodiments and descriptions of the disclosure are intended to explain the disclosure, and do not form improper limits to the disclosure. In the drawings.

DETAILED DESCRIPTION OF THE EMBODIMENTS

Figure 1:
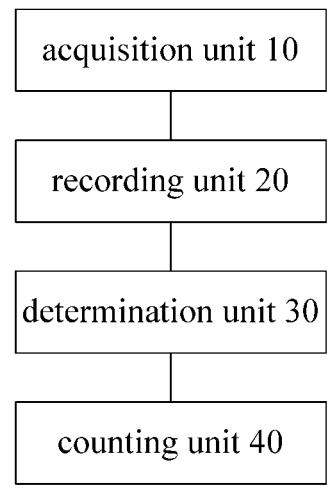
FIG. 1 is a diagram of a data processing apparatus for counting webpage hits according to a first embodiment of the disclosure.

It is important to note that the embodiments of the disclosure and the characteristics in the embodiments can be combined under the condition of no conflicts. The disclosure is described in detail below with reference to the drawings and the embodiments.

In order to make those skilled in the art better understand the solution of the disclosure, the embodiments of the disclosure are clearly and completely described below with reference to the drawings in the embodiments of the disclosure. Obviously, the described embodiments are only a part of the embodiments of the disclosure, not all of the embodiments. On the basis of the embodiments of the disclosure, all other embodiments obtained on the premise of no creative work of those skilled in the art shall fall within the protection scope of the disclosure.

It is important to note that the description and claims of the disclosure and terms 'first', 'second' and the like in the drawings are intended to distinguish similar objects, and do not need to describe a specific sequence or a precedence order. It should be understood that used data can be exchanged under appropriate conditions, in order that the embodiments of the disclosure described here can be implemented in a sequence except sequences graphically shown or described here. In addition, terms 'include' and 'have' and any inflexions thereof are intended to cover non-exclusive inclusions.

According to an embodiment of the disclosure, a data processing apparatus for counting webpage hits is provided. The apparatus is configured to count hits of each pixel point on a webpage to obtain the number of hit hotspot regions of the webpage.

FIG. 1 is a diagram of a data processing apparatus for counting webpage hits according to a first embodiment of the disclosure.

As shown in FIG. 1, the apparatus includes: an acquisition unit 10, a recording unit 20, a determination unit 30 and a counting unit 40.

The acquisition unit 10 is configured to acquire a coordinate system of a monitored webpage. In the embodiment of the disclosure, the webpage can be a webpage under multiple platforms and a webpage in multiple browsers, and the coordinate system can be an orthogonal rectangular coordinate system. The acquisition unit 10 is configured to acquire the coordinate system of the monitored webpage, including a coordinate origin, a coordinate horizontal axis (X axis) and a positive direction thereof, a coordinate longitudinal axis (Y axis) and a positive direction thereof, and unit lengths of the orthogonal rectangular coordinate system, wherein a point at the upper left corner of the webpage is set as the coordinate origin, a horizontally rightward direction of the webpage is set as the positive direction of the coordinate horizontal axis, a vertically upward direction of the webpage is set as the positive direction of the coordinate longitudinal axis, the unit lengths can be 1 nm or 1 um or the like, and the unit lengths can be determined according to coordinate precision. Through the coordinate system of the monitored webpage, acquired by the acquisition unit 10, coordinates of a random point in the monitored webpage can be acquired. It is important to note that in the embodiment of the disclosure, the unit lengths correspond to unit areas, each unit area corresponds to a set of pixel points, and the number of pixel points in each unit area depends on the setting of the corresponding unit length. Thus, the hits can be recorded according to the number of hit pixels in the unit areas by taking the unit areas as a counting basis. In the embodiment of the disclosure, each unit length can also be 1 pixel (px for short) unit. Thus, on the webpage, each coordinate corresponds to a pixel point, and the hits can be recorded according to the number of the hit pixels corresponding to the coordinates by taking the coordinates as a counting basis.

The recording unit 20 is configured to record the hits on the webpage by the coordinate system. It is important to note that the recording unit 20 can be configured to record the webpage hits within a predetermined time period by means of the coordinate system, wherein the hits are hits of pixel points corresponding to different regions in the webpage instead of the whole hits of the webpage. In the embodiment of the disclosure, the recording unit 20 may include one or multiple recording modules, wherein each recording module may include a counter. The webpage is composed of many points, each point corresponding to a recording module via coordinates thereof. When browsing the webpage, a user will hit the points in the webpage. Once the user hits a point in the webpage for one time, the recording module corresponding to the coordinates of the point will be added with 1. Otherwise, when the user hits the point that is not the above said point, the recording module corresponding to the coordinates of the point will remain unchanged. Thus, within the predetermined time period, different recording modules can record the hits of different points on the webpage.

The determination unit 30 is configured to determine hotspot regions on the webpage according to the hits. It is important to note that hotspots refer to news or information well concerned or received by the broad masses, or refer to places or problems noticeable within a certain period. In the embodiment of the disclosure, the hotspot regions on the webpage refer to webpage regions of which the hit count is relatively large or the hit density is relatively high. Particularly, the hotspot regions can be webpage regions of which the hit count exceeds a predetermined value.

The counting unit 40 is configured to count the number of determined hotspot regions. In the embodiment of the disclosure, the counting unit 40 may be a counter or a hash table. In the embodiment of the disclosure, a webpage interface is divided into different regions. Thus, when the counting unit 40 is the counter, if it is determined that a certain region on the webpage interface is a hotspot region, the counting of the counter is added with 1. Otherwise, if it is determined that a certain region on the webpage interface is not a hotspot region, the counting of the counter remains unchanged. When the counting unit 40 is the hash table, hotspot regions can be key words of the hash table, and the number of the hotspot regions is a hash value of the hash table. Thus, when it is determined that a certain region on the webpage interface is a hotspot region, it is judged whether the hotspot region is a key word of the hash table. If the hotspot region is the key word of the hash table, the hash value of the hash table remains unchanged. If the hotspot region is not the key word of the hash table, the key word of the hash table of the hotspot region is added to the hash table, and the hash value of the hash table is added with 1. Otherwise, if it is determined that a certain region on the webpage interface is not a hotspot region, the hash value of the hash table remains unchanged.

By means of the disclosure, the coordinates of each point under the coordinate system of the webpage are acquired via the acquisition unit 10; the hits of each point within the predetermined time period are recorded via the recording unit 20; the hotspot regions of the webpage are determined via the determination unit 30 according to the sizes of the hits; and the hotspot regions on the webpage are counted via the counting unit 40. The problem in the relevant art that there is a lack of counting of the hits of each point in the webpage is solved, thereby achieving the effect of automatically counting the number of hit hotspot regions in the webpage.

Figure 2:
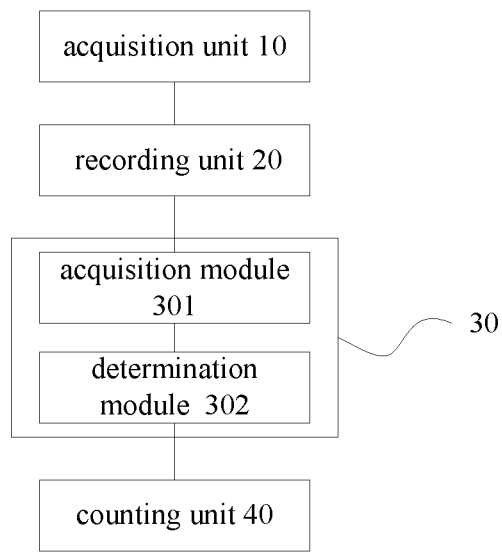
FIG. 2 is a diagram of a data processing apparatus for counting webpage hits according to a second embodiment of the disclosure.

FIG. 2 is a diagram of a data processing apparatus for counting webpage hits according to a second embodiment of the disclosure.

As shown in FIG. 2, the embodiment can serve as a preferred implementation mode of the embodiment shown in FIG. 1. The data processing apparatus for counting webpage hits according to the embodiment includes an acquisition unit 10, a recording unit 20, a determination unit 30 and a counting unit 40 in the first embodiment, wherein the determination unit 30 includes an acquisition module 301 and a determination module 302.

The acquisition unit 10, the recording unit 20 and the counting unit 40 are identical to those in the first embodiment in function, no more detailed descriptions here.

The acquisition module 301 is configured to acquire a region of which the density of the hits is greater than a predetermined threshold value. Specifically, the acquisition module 301 can be configured to acquire the region of which the density of the hits is greater than the predetermined threshold value by comparing the density of the hits of each point with the predetermined threshold value. When the density of the hits of points in a certain region on a webpage is greater than the predetermined threshold value, the region is the acquired region of which the density of the hits is greater than the predetermined threshold value, the region of which the density of the hits is greater than the predetermined threshold value is a hotspot region, and the hotspot region is determined according to the density of the hits of each point on the webpage and the predetermined threshold value, wherein the position of the hotspot region is determined according to the density of the hits of each point on the webpage, and the predetermined threshold value determines the size of the hotspot region. When the predetermined threshold value is relatively large, the hotspot region is relatively small. Otherwise, when the predetermined threshold value is relatively small, the hotspot region is relatively large.

In the embodiment of the disclosure, specifically, the acquisition module 301 includes a vector processing sub-module, a mean sub-module, a first judgment sub-module, a first acquisition sub-module, a second judgement sub-module and a second acquisition sub-module. The vector processing sub-module is configured to optionally select a point in a two-dimensional planar space of the webpage, and then describe a circle by taking the point as the centre of the circle and taking r as a radius, wherein a vector will be generated between each hit point falling within the circle and the centre of the circle, the centre of the circle is taken as a starting point of the vector, a hit point falling within the circle is taken as an end point, and there can be one or multiple vectors. The mean sub-module is configured to add the one or multiple vectors to obtain a Meanshift vector, wherein Meanshift is an effective iterative counting algorithm, and the Meanshift vector is a vector obtained by the iterative counting algorithm. The first judgment sub-module is configured to judge whether a modulus of the Meanshift vector is smaller than a predetermined extreme value, wherein the predetermined extreme value can be a number small enough. Thus, when the first judgment sub-module judges that the modulus of the Meanshift vector is not smaller than the predetermined extreme value, the vector processing sub-module is further configured to describe a circle by taking an end point of the Meanshift vector as the centre of the circle and taking r as a radius, wherein each hit point falling within the circle and the centre of the circle will generate another vector, the end point of the Meanshift vector is taken as a starting point of the vector, a hit point falling within the circle is taken as an end point, and there can be one or multiple vectors. The mean sub-module is further configured to add the one or multiple vectors to obtain another Meanshift vector, and this situation continues until the first judgment sub-module judges that the modulus of the Meanshift vector is smaller than the predetermined extreme value; and when the first judgment sub-module judges that the modulus of the Meanshift vector is smaller than the predetermined extreme value, the first acquisition sub-module acquires the density of the hits and an independent continuous region according to the Meanshift vector. In the embodiment of the disclosure, specifically, a hit count of each region in the independent continuous region is acquired, each hit count is divided by the corresponding region to obtain the density of the hits of the corresponding region, coordinate positions of the centre of the circle in the webpage can be classified and aggregated, and a region formed by a set of coordinates of the centre of the circle, pointing to the same end point, in the webpage is recorded as the independent continuous region. The second judgment sub-module is configured to judge whether the density of the hits is greater than the predetermined threshold value. The second acquisition sub-module is configured to acquire the region of which the density of the hits is greater than the predetermined threshold value in the independent continuous region.

The determination module 302 is configured to take the acquired region as a hotspot region.

Thus, in the embodiment of the disclosure, the region of which the hits are greater than the predetermined threshold value is acquired by comparing the hits with the predetermined threshold value via the acquisition module 301, the region is determined as the hotspot region via the determination module 302, and the density of hotspots of the webpage is calculated via a first calculation unit 40 and a second calculation unit 50. The problem in the relevant art that there is a lack of counting of the hits of each point in the webpage is solved, thereby achieving the effect of automatically counting the number of hit hotspot regions in the webpage.

According to an embodiment of the disclosure, a data processing method for counting webpage hits is provided. The method is used for counting hits of each pixel point on a webpage to obtain the number of hit hotspot regions of the webpage. The data processing method for counting webpage hits can operate on a computer processing device. It is important to note that the data processing method for counting webpage hits provided by the embodiment of the disclosure can be executed by the data processing apparatus for counting webpage hits provided by the embodiment of the disclosure, and the data processing apparatus for counting webpage hits according to the embodiment of the disclosure can also be used for executing the data processing method for counting webpage hits according to the embodiment of the disclosure.

Figure 3:
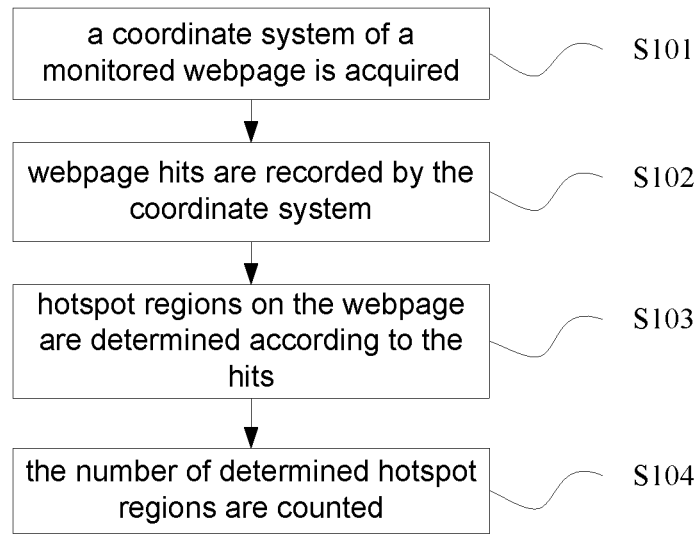
FIG. 3 is a flowchart of a data processing method for counting webpage hits according to a first embodiment of the disclosure.

FIG. 3 is a flowchart of a data processing method for counting webpage hits according to a first embodiment of the disclosure.

As shown in FIG. 3, the method includes Step S101 to Step S104 as follows.

Step S101: A coordinate system of a monitored webpage is acquired.

In the embodiment of the disclosure, the webpage can be a webpage under multiple platforms and under multiple browsers, and the coordinate system can be an orthogonal rectangular coordinate system. The acquired coordinate system of the monitored webpage includes a coordinate origin, a coordinate horizontal axis (X axis) and a positive direction thereof, a coordinate longitudinal axis (Y axis) and a positive direction thereof, and unit lengths of the orthogonal rectangular coordinate system, wherein a point at the upper left corner of the webpage can be set as the coordinate origin, a horizontally rightward direction of the webpage can be set as the positive direction of the coordinate horizontal axis, a vertically upward direction of the webpage can be set as the positive direction of the coordinate longitudinal axis, the unit lengths can be 1 nm or 1 um or the like, and the unit lengths can be determined according to coordinate precision. The acquired coordinate system of the monitored webpage can acquire coordinates of a random point in the monitored webpage. It is important to note that in the embodiment of the disclosure, the unit lengths correspond to unit areas, each unit area corresponds to a set of pixel points, and the number of pixel points in each unit area depends on the setting of the corresponding unit length. Thus, the hits can be recorded according to the number of hit pixels in the unit areas by taking the unit areas as a counting basis. In the embodiment of the disclosure, each unit length can also be 1 pixel (px for short) unit. Thus, on the webpage, each coordinate corresponds to a pixel point, and the hits can be recorded according to the number of the hit pixels corresponding to the coordinates by taking the coordinates as a counting basis.

Step S102: Webpage hits are recorded by the coordinate system.

It is important to note that the webpage hits within a predetermined time period can be recorded by the coordinate system, wherein the hits are hits of pixel points corresponding to different regions in the webpage instead of the whole hits of the webpage. The webpage is composed of many points, each point corresponding to a counter via coordinates thereof. When browsing the webpage, a user will hit the points in the webpage. Once the user hits a point in the webpage for one time, the counter corresponding to the coordinates of the point will be added with 1. Otherwise, when the user hits the point that is not the above said point, the counter corresponding to the coordinates of the point will remain unchanged. Thus, within the predetermined time period, the hits of different points on the webpage can be recorded.

Step S103: Hotspot regions on the webpage are determined according to the hits.

It is important to note that hotspots refer to news or information well concerned or received by the broad masses, or refer to places or problems noticeable within a certain period. In the embodiment of the disclosure, the hotspot regions on the webpage refer to webpage regions of which the hit count is relatively large or the hit density is relatively high. Particularly, the hotspot regions can be webpage regions of which the hit count exceeds a predetermined value.

Step S104: The number of determined hotspot regions are counted.

In the embodiment of the disclosure, the determined hotspot regions on the webpage can be counted via a counter or a hash table. In the embodiment of the disclosure, a webpage interface is divided into different regions. Thus, when the hotspot regions are counted via the counter, if it is determined that a certain region on the webpage interface is a hotspot region, the counting of the counter is added with 1. Otherwise, if it is determined that a certain region on the webpage interface is not a hotspot region, the counting of the counter remains unchanged. When the hotspot regions on the webpage are counted via the hash table, hotspot regions can be key words of the hash table, and the number of the hotspot regions is a hash value of the hash table. Thus, when it is determined that a certain region on the webpage interface is a hotspot region, it is judged whether the hotspot region is a key word of the hash table. If the hotspot region is the key word of the hash table, the hash value of the hash table remains unchanged. If the hotspot region is not the key word of the hash table, the key word of the hash table of the hotspot region is added to the hash table, and the hash value of the hash table is added with 1. Otherwise, if it is determined that a certain region on the webpage interface is not a hotspot region, the hash value of the hash table remains unchanged.

By means of the disclosure, the coordinates of each point under the coordinate system of the webpage are acquired; the hits of each point within the predetermined time period are recorded; the hotspot regions of the webpage are determined according to the sizes of the hits; and the hotspot regions on the webpage are counted. The problem in the relevant art that there is a lack of counting of the hits of each point in the webpage is solved, thereby achieving the effect of automatically counting the number of hit hotspot regions in the webpage.

Figure 4:
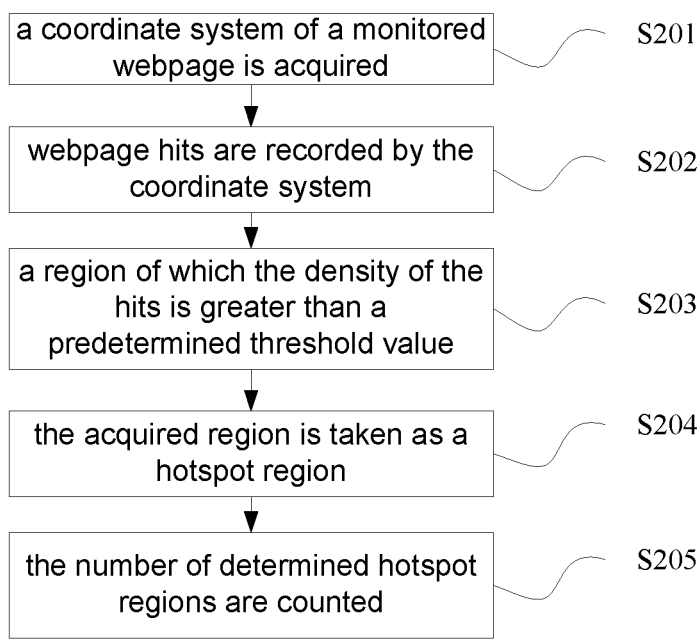
FIG. 4 is a flowchart of a data processing method for counting webpage hits according to a second embodiment of the disclosure.

FIG. 4 is a flowchart of a data processing method for counting webpage hits according to a second embodiment of the disclosure.

As shown in FIG. 4, the data processing method for counting webpage hits includes Step S201 to Step S205 as follows. The embodiment can serve as a preferred implementation mode of the embodiment shown in FIG. 3.

Step S201 and Step S202 are identical to Step S101 and Step S102 in the embodiment shown in FIG. 3, no more detailed descriptions here.

Step S203: A region of which the density of the hits is greater than a predetermined threshold value.

Specifically, in the embodiment of the disclosure, the region of which the density of the hits is greater than the predetermined threshold value can be acquired by comparing the density of the hits of each point with the predetermined threshold value. When the density of the hits of points in a certain region on a webpage is greater than the predetermined threshold value, the region is the acquired region of which the density of the hits is greater than the predetermined threshold value, the region of which the density of the hits is greater than the predetermined threshold value is a hotspot region, and the hotspot region is determined according to the density of the hits of each point on the webpage and the predetermined threshold value, wherein the position of the hotspot region is determined according to the density of the hits of each point on the webpage, and the predetermined threshold value determines the size of the hotspot region. When the predetermined threshold value is relatively large, the hotspot region is relatively small. Otherwise, when the predetermined threshold value is relatively small, the hotspot region is relatively large.

In the embodiment of the disclosure, specifically, the region of which the density of the hits is greater than the predetermined threshold value can be acquired by means of the steps as follows.

Step 1: A point is optionally selected in a two-dimensional planar space of the webpage, and then a circle is described by taking the point as the centre of the circle and taking r as a radius, wherein a vector will be generated between each hit point falling within the circle and the centre of the circle, the centre of the circle is taken as a starting point of the vector, a hit point falling within the circle is taken as an end point, and there can be one or multiple vectors.

Step 2: The one or multiple vectors are added to obtain a Meanshift vector, wherein Meanshift is an effective iterative counting algorithm, and the Meanshift vector is a vector obtained by the iterative counting algorithm.

Step 3: It is judged whether a modulus of the Meanshift vector is smaller than a predetermined extreme value, wherein the predetermined extreme value can be a number small enough. Thus, when it is judged that the modulus of the Meanshift vector is not smaller than the predetermined extreme value, Step 1 and Step 2 are executed in sequence until it is judged that the modulus of the Meanshift vector is smaller than the predetermined extreme value. It is important to note that at this moment, in Step 1, a circle is described by taking an end point of the Meanshift vector as the centre of the circle and taking r as a radius, wherein each hit point falling within the circle and the centre of the circle will generate another vector, the end point of the Meanshift vector is taken as a starting point of the vector, a hit point falling within the circle is taken as an end point, and there can be one or multiple vectors.

Step 4: When it is judged that the modulus of the Meanshift vector is smaller than the predetermined extreme value, the density of the hits and an independent continuous region are acquired according to the Meanshift vector. In the embodiment of the disclosure, specifically, a hit count of each region in the independent continuous region can be acquired, each hit count is divided by the corresponding region to obtain the density of the hits of the corresponding region, coordinate positions of the centre of the circle in the webpage can be classified and aggregated, and a region formed by a set of coordinates of the centre of the circle, pointing to the same end point, in the webpage is recorded as the independent continuous region. It is judged whether the density of the hits is greater than the predetermined threshold value. The region of which the density of the hits is greater than the predetermined threshold value is acquired in the independent continuous region.

Step S204: The acquired region is taken as a hotspot region.

Step S205 is identical to Step S104 in the embodiment shown in FIG. 3, no more detailed descriptions here.

Thus, in the embodiment of the disclosure, the region of which the hits are greater than the predetermined threshold value is acquired by comparing the hits with the predetermined threshold value, the region is determined as the hotspot region, and the hotspot regions on the webpage are counted. The problem in the relevant art that there is a lack of counting of the hits of each point in the webpage is solved, thereby achieving the effect of automatically counting the number of hit hotspot regions in the webpage.

Obviously, those skilled in the art should understand that all modules or all steps in the embodiments of the disclosure can be realized by using a generic computation apparatus, can be centralized on a single computation apparatus or can be distributed on a network composed of a plurality of computation apparatuses. Optionally, they can be realized by using executable program codes of the computation apparatuses. Thus, they can be stored in a storage apparatus and executed by the computation apparatuses, or they are manufactured into each integrated circuit module respectively, or a plurality of modules or steps therein are manufactured into a single integrated circuit module. Thus, the disclosure is not limited to a combination of any specific hardware and software.

The above is only the preferred embodiments of the disclosure, and is not intended to limit the invention. There can be various modifications and variations in the disclosure for those skilled in the art. Any modifications, equivalent replacements, improvements and the like within the spirit and principle of the disclosure shall fall within the protection scope of the invention.

What is claimed is:

1. A computer-implemented data processing method for counting webpage hits, comprising:
   acquiring a coordinate system of a monitored webpage;
   recording hits on the webpage based on the coordinate system;
   determining hotspot regions on the webpage according to the hits; and
   counting the number of determined hotspot regions;
   wherein determining the hotspot regions on the webpage according to the hits comprises:
      acquiring a region of which the density of the hits is greater than a predetermined threshold value; and
      taking the acquired region as a hotspot region;
   further wherein acquiring the region of which the density of the hits is greater than the predetermined threshold value comprises the steps of:
      selecting a point in a two-dimensional planar space of the webpage, and then defining a circle of radius r having the selected point as the centre of the circle;
      generating a vector between each hit point falling within the circle and the centre of the circle, wherein the centre of the circle is the starting point of the vector and the hit point is the end point of the vector, wherein one or more vectors are generated for the circle;
      adding said one or more vectors generated in the circle to obtain a Meanshift vector;
      determining whether a modulus of the Meanshift vector is smaller than a predetermined extreme value;
      acquiring the density of the hits and an independent continuous region according to the Meanshift vector when it is determined that the modulus of the Meanshift vector is smaller than the predetermined extreme value;

determining whether the density of the hits is greater than the predetermined threshold value; and acquiring the region of which the density of the hits is greater than the predetermined threshold value in the independent continuous region.

2. The data processing method according to claim 1, wherein the density of the hits is acquired in modes as follows:

acquiring hit count of each region in the independent continuous region; and dividing each hit count by the corresponding region to obtain the density of the hits of the corresponding region.

3. The data processing method according to claim 1, wherein the independent continuous region is obtained in modes as follows:

classifying and aggregating coordinate positions of the centre of the circle in the webpage; and recording a region formed by a set of coordinates of the centre of the circle, pointing to the same end point, in the webpage as the independent continuous region.

4. A data processing apparatus for counting webpage hits, comprising a programmed computer processing device adapted to (a) acquire a coordinate system of a monitored webpage and record hits on the webpage based on the coordinate system;

(b) determine hotspot regions on the webpage according to the hits; and (c) count the number of determined hotspot regions;

wherein the programmed computer processing device is configured to determine hotspot regions on the webpage according to the hits by:

(1) acquiring a region of which the density of the hits is greater than a predetermined threshold value by— selecting a point in a two-dimensional planar space of the webpage, and then defining a circle of radius r having the selected point as the centre of the circle;

generating a vector between each hit point falling within the circle and the centre of the circle, wherein the centre of the circle is the starting point of the vector and the hit point is the end point of the vector, wherein one or more vectors are generated for the circle;

adding said one or more vectors generated in the circle to obtain a Meanshift vector;

determining whether a modulus of the Meanshift vector is smaller than a predetermined extreme value;

acquiring the density of the hits and an independent continuous region according to the Meanshift vector when it is determined that the modulus of the Meanshift vector is smaller than the predetermined extreme value;

determining whether the density of the hits is greater than the predetermined threshold value; and acquiring the region of which the density of the hits is greater than the predetermined threshold value in the independent continuous region;

and (2) taking the acquired region as a hotspot region.

5. The data processing apparatus according to claim 4, further configured to acquire hit count of each region in the independent continuous region, and divide each hit count by the corresponding region to obtain the density of the hits of the corresponding region.

6. The data processing apparatus according to claim 4, further configured to classify and aggregate coordinate positions of the centre of the circle in the webpage, and take a region formed by a set of coordinates of the centre of the circle, pointing to the same end point, in the webpage as the independent continuous region.

* * * * *